(12) United States Patent
Lee et al.

(10) Patent No.: US 11,310,389 B2
(45) Date of Patent: Apr. 19, 2022

(54) DOCUMENT FEEDER USING SINGLE MOTOR AND IMAGE READING APPARATUS INCLUDING THE SAME

(71) Applicant: Hewlett-Packard Development Company, L.P., Spring, TX (US)

(72) Inventors: Jung Hoon Lee, Suwon-si (KR); Takuya Ito, Yokohama (JP); Jang Won Seo, Pangyo (KR); Jae Hoon Lee, Pangyo (KR); Whan Woo Lee, Pangyo (KR); Soo Hyun Kim, Pangyo (KR); Seung Rae Kim, Suwon-si (KR); Seung Beom Yang, Suwon-si (KR); Ji Young Lee, Suwon-si (KR); Sung Hyun Yoon, Pangyo (KR); Koo Won Park, Pangyo (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 16/966,410

(22) PCT Filed: Nov. 30, 2018

(86) PCT No.: PCT/KR2018/015155
§ 371 (c)(1),
(2) Date: Jul. 30, 2020

(87) PCT Pub. No.: WO2019/151633
PCT Pub. Date: Aug. 8, 2019

(65) Prior Publication Data
US 2020/0366808 A1    Nov. 19, 2020

(30) Foreign Application Priority Data

Jan. 31, 2018   (KR) .......................... 10-2018-0012451

(51) Int. Cl.
*H04N 1/04* (2006.01)
*H04N 1/12* (2006.01)
*H04N 1/00* (2006.01)

(52) U.S. Cl.
CPC ....... *H04N 1/1215* (2013.01); *H04N 1/00689* (2013.01); *H04N 1/00694* (2013.01);
(Continued)

(58) Field of Classification Search
None
See application file for complete search history.

(56) References Cited

U.S. PATENT DOCUMENTS 5,854,696 A * 12/1998 Yun .................. H04N 1/207
358/498
6,982,815 B2 * 1/2006 Tsutsumi ............ H04N 1/0464
318/685

(Continued)

FOREIGN PATENT DOCUMENTS

CN      1645897     7/2005
CN      101264831   9/2008
(Continued)

*Primary Examiner* — Dung D Tran
(74) *Attorney, Agent, or Firm* — Staas & Halsey LLP

(57) ABSTRACT

An image reading apparatus includes an image sensor, a document feeder, and a processor. The document feeder includes a first driving device, a second driving device, a third driving device, a first sensor, and a second sensor. The first driving device includes a pick-up member to move documents from a tray to a document conveying path using a driving force through a first clutch. The second driving device is to move the tray with the documents to a side of the pick-up member using a driving force through a second clutch. The third driving device to move the documents along the document conveying path onto the image sensor using the driving force of the motor The first and second sensors detect the documents on the document conveying (Continued)

path. The processor controls an operation of the first clutch based on the signals of the first and second sensors.

13 Claims, 7 Drawing Sheets

(52) U.S. Cl.
CPC ..... *H04N 1/00705* (2013.01); *H04N 1/00782* (2013.01); *H04N 1/00798* (2013.01); *H04N 1/122* (2013.01)

(56) References Cited

U.S. PATENT DOCUMENTS

| | | | | |
|---|---|---|---|---|
| 2004/0240916 | A1* | 12/2004 | Takata | G03G 15/6567 399/367 |
| 2006/0179987 | A1* | 8/2006 | Park | B02C 18/0007 83/167 |
| 2007/0257422 | A1* | 11/2007 | Suzuki | H04N 1/00578 271/225 |
| 2009/0148173 | A1* | 6/2009 | Tajima | G03G 21/00 399/36 |
| 2010/0054833 | A1* | 3/2010 | Hanamoto | G03G 15/6579 399/374 |
| 2010/0072691 | A1* | 3/2010 | Ueda | H04N 1/0057 271/110 |
| 2010/0148420 | A1* | 6/2010 | Hamano | B65H 3/0607 271/3.15 |
| 2015/0312425 | A1 | 10/2015 | Saito | |
| 2019/0068815 | A1* | 2/2019 | Andoh | G03G 15/602 |

FOREIGN PATENT DOCUMENTS

| | | |
|---|---|---|
| EP | 1971122 | 9/2008 |
| JP | 06263332 | 9/1994 |
| JP | 07010395 | 1/1995 |
| JP | 08067412 | 3/1996 |
| JP | 2015218012 | 12/2015 |
| KR | 1019940008378 | 4/1994 |

* cited by examiner

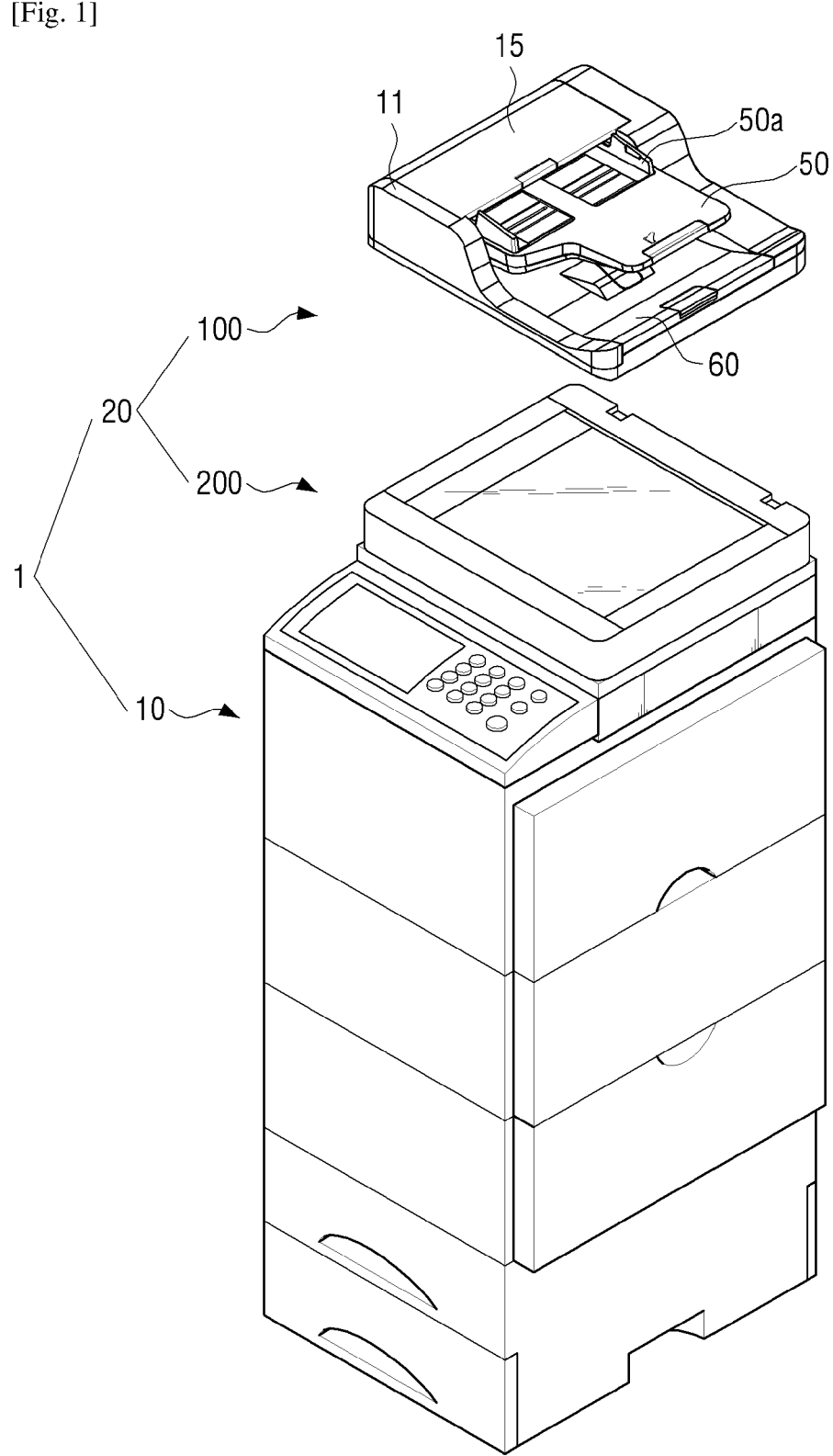
[Fig. 1]

[Fig. 2]
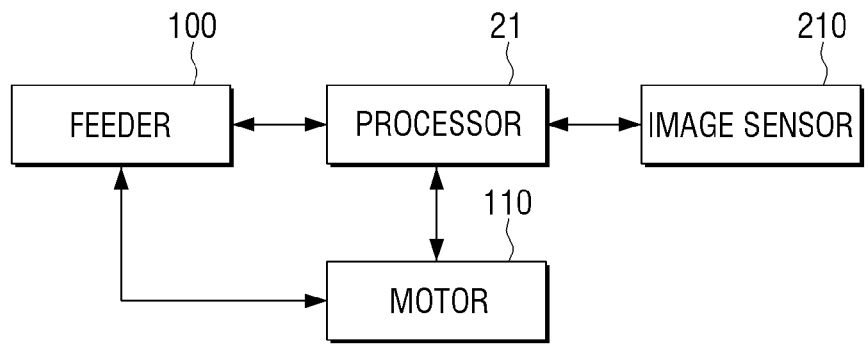
[Fig. 3]
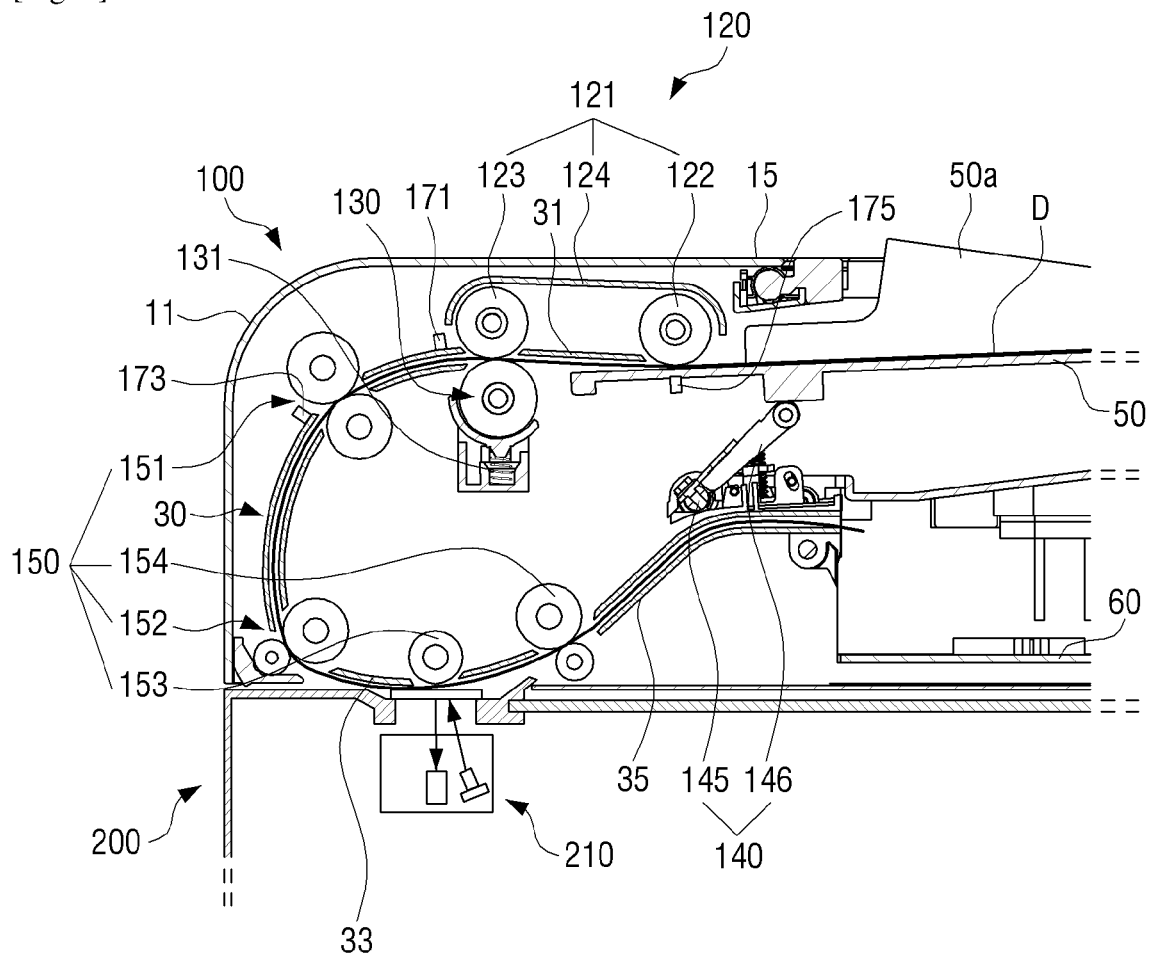

[Fig. 4]
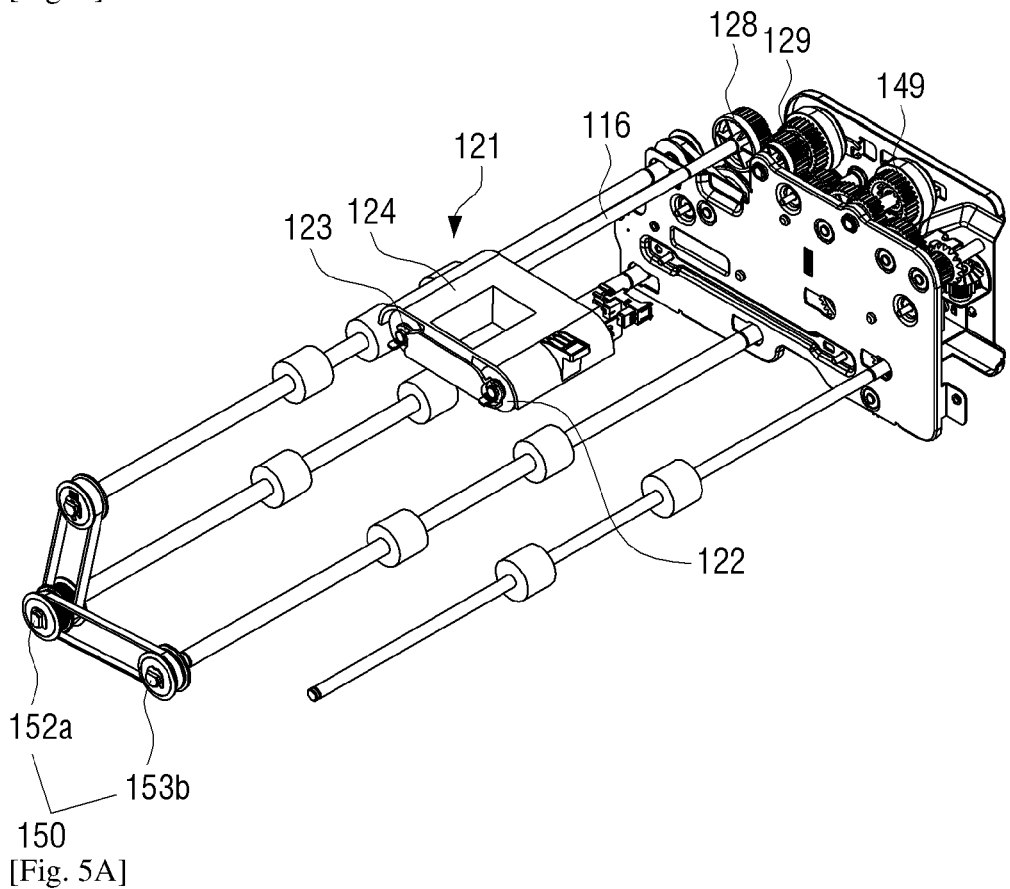
[Fig. 5A]
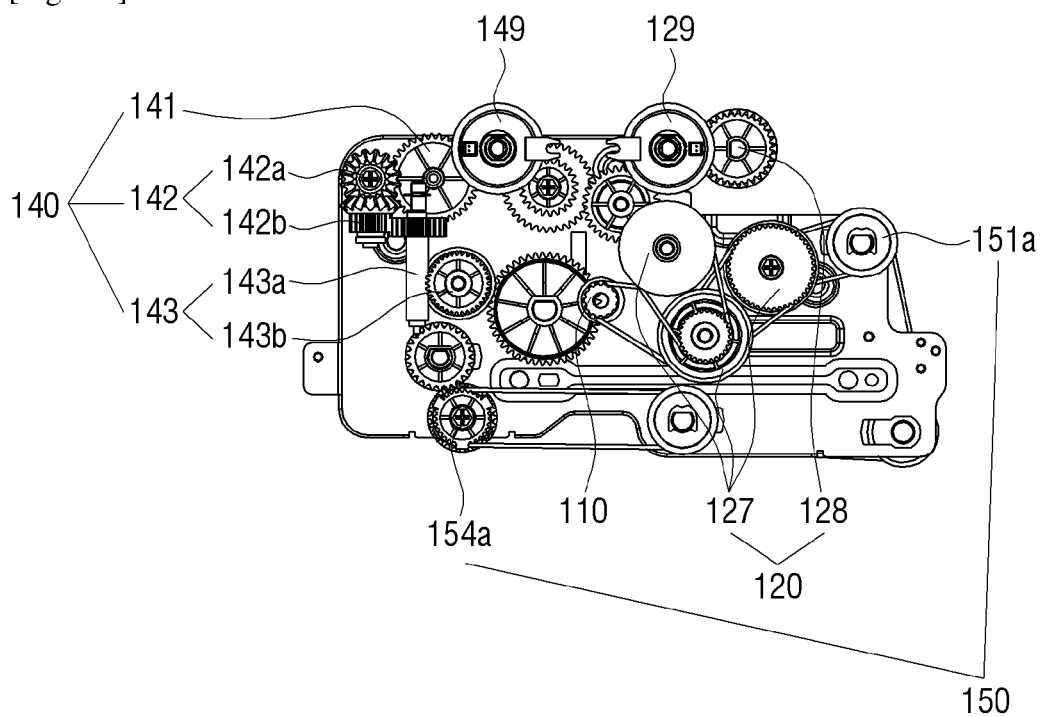

[Fig. 5B]
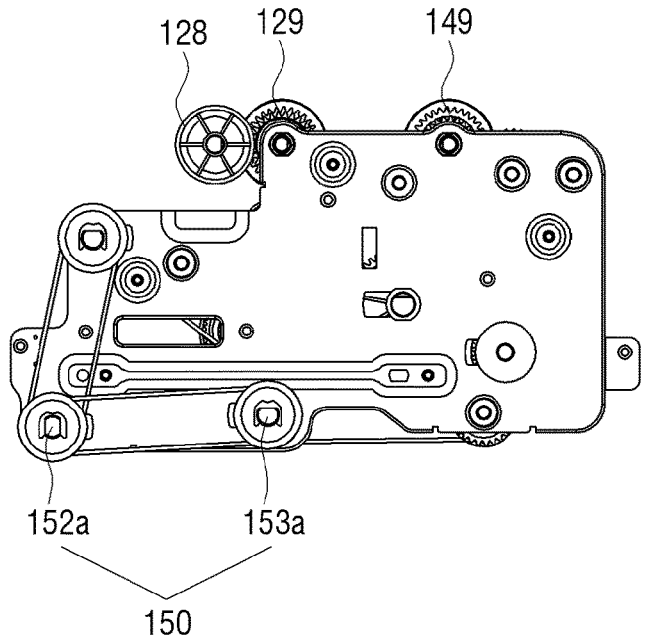
[Fig. 6]
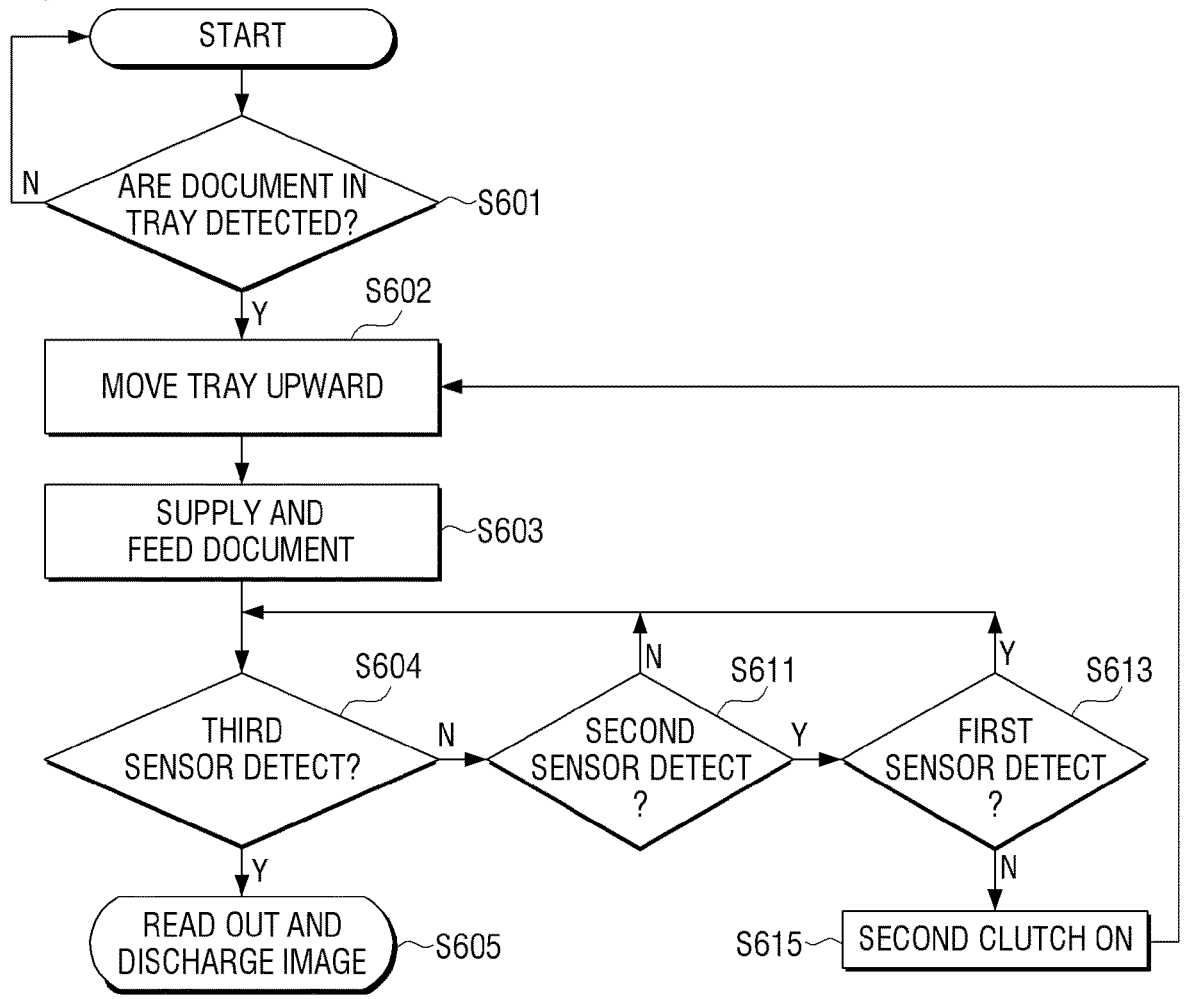

[Fig. 7A]
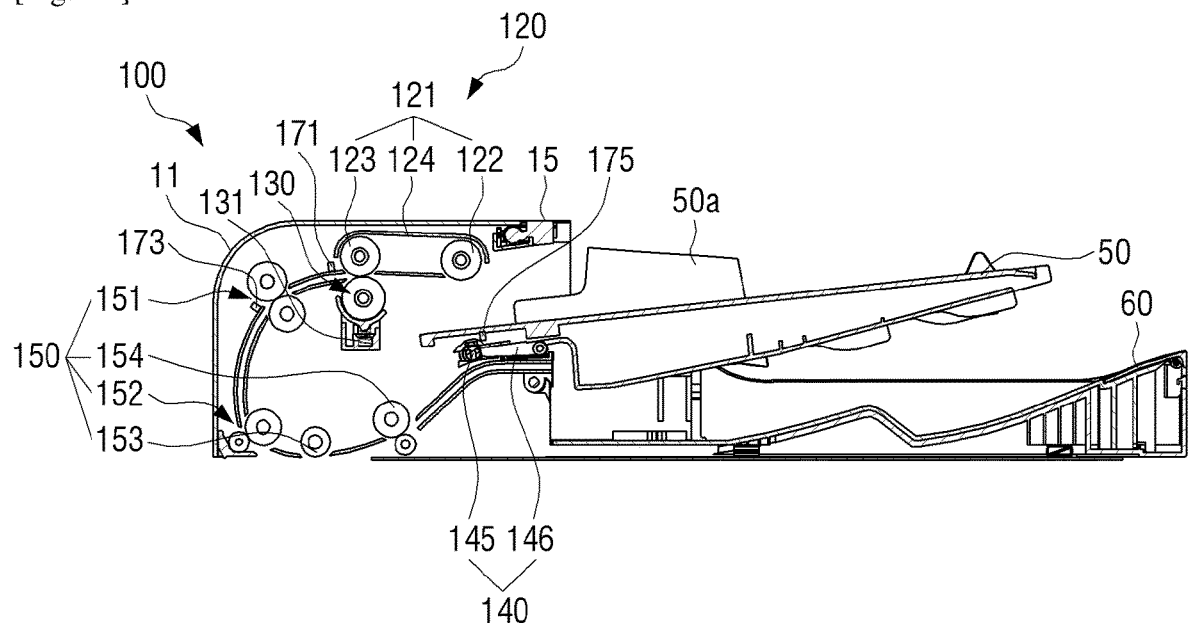
[Fig. 7B]
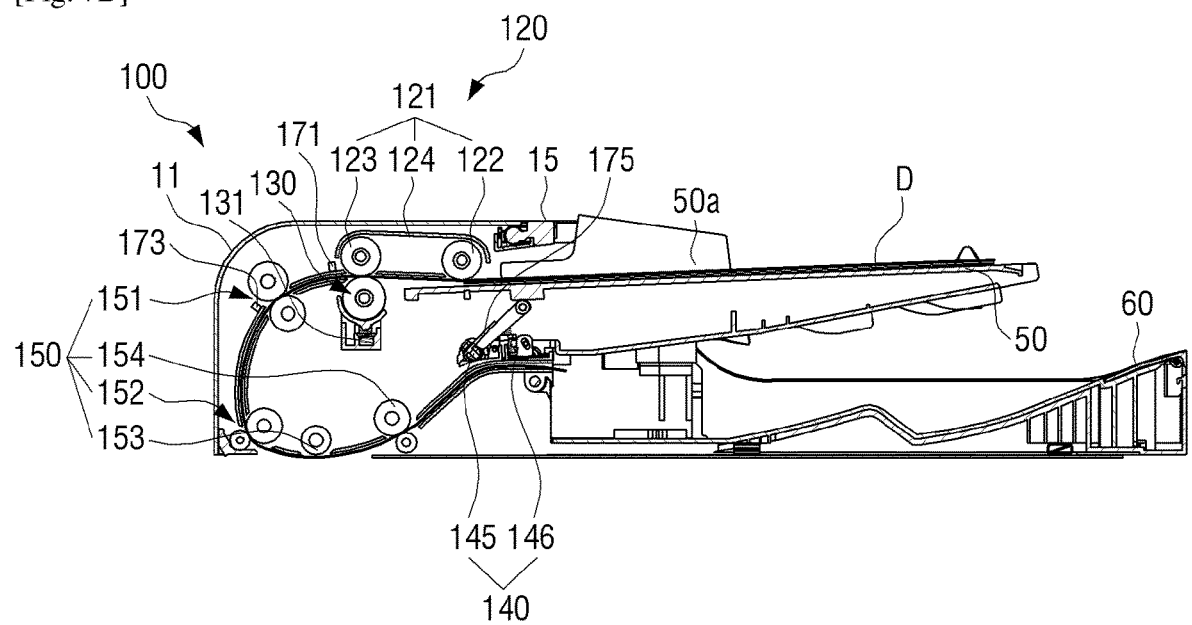

[Fig. 8]
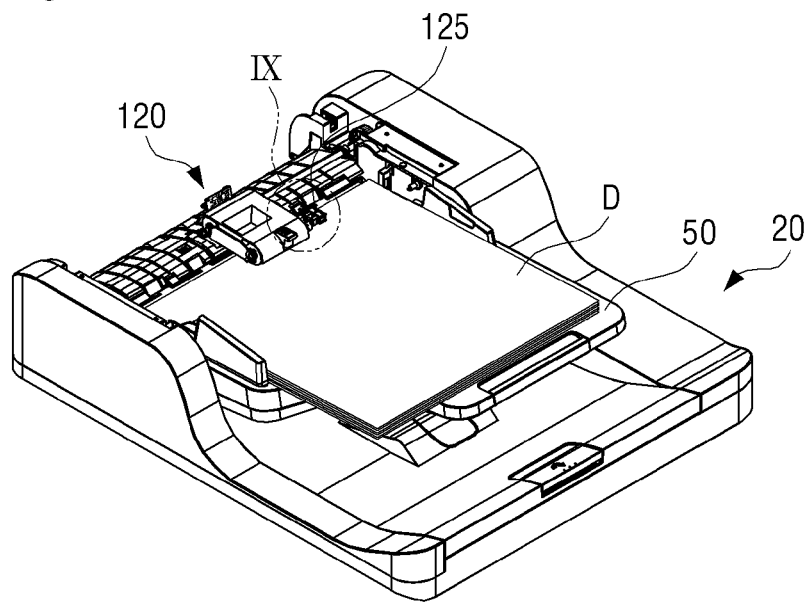
[Fig. 9A]
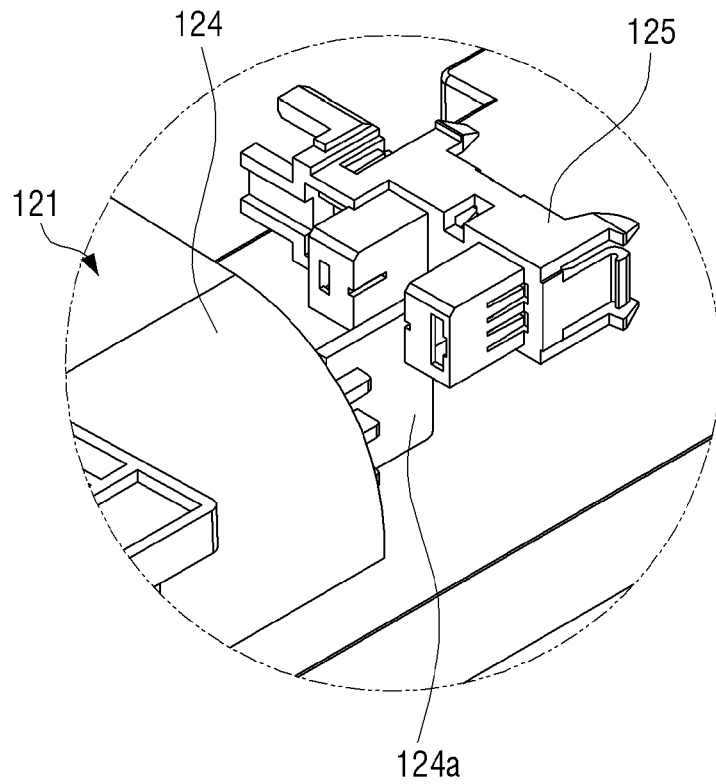

[Fig. 9B]
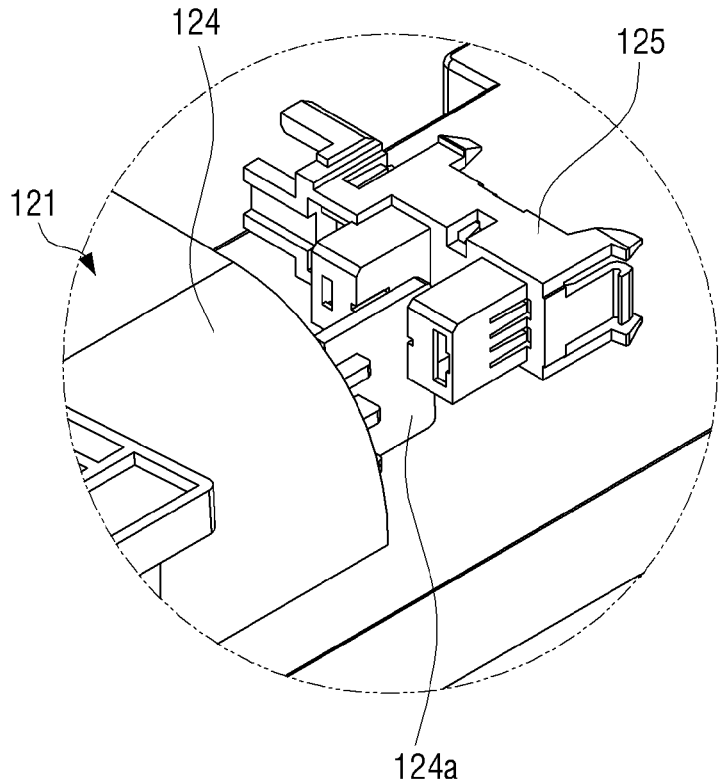
[Fig. 10]
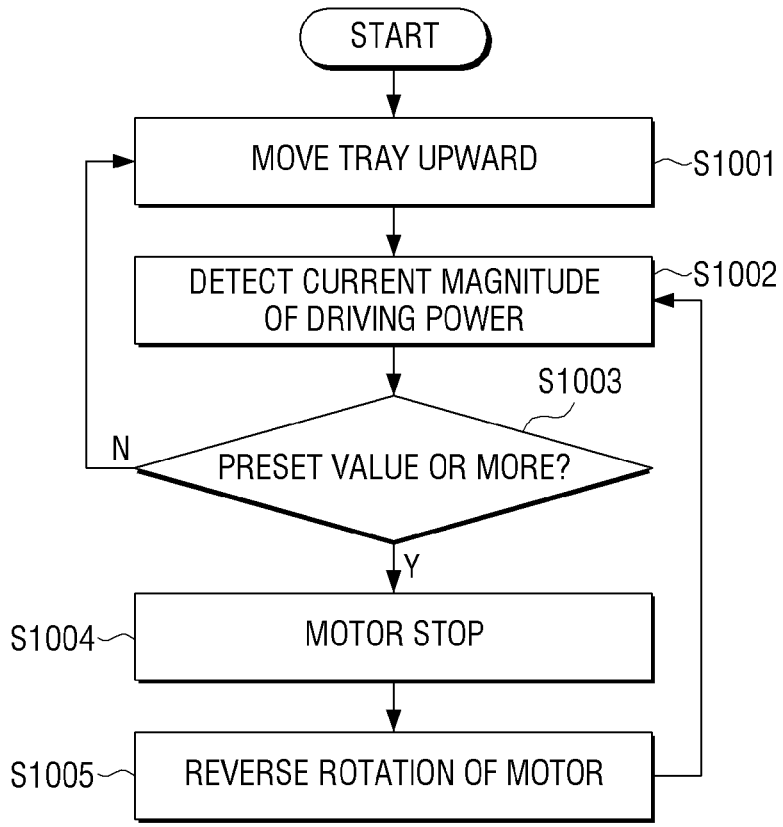

DOCUMENT FEEDER USING SINGLE MOTOR AND IMAGE READING APPARATUS INCLUDING THE SAME

CROSS REFERENCE TO RELATED APPLICATIONS

This application is a U.S. National Stage Application which claims the benefit under 35 U.S.C. § 371 of International Patent Application No. PCT/KR2018/015155 filed on Nov. 30, 2018, which claims foreign priority benefit under 35 U.S.C. § 119 of Korean Patent Application No. 10-2018-0012451 filed on Jan. 31, 2018, in the Korean Intellectual Property Office, the contents of all of which are incorporated herein by reference.

BACKGROUND

In general, image forming apparatuses such as printers, facsimiles, copiers, and multifunction peripherals (MFP) may include image forming units which form images onto printing media and image reading apparatuses which read image information of documents together with the image forming units.

The image reading apparatuses may include image sensors which scan images from documents and feeders which automatically supply documents to be scanned to document conveying paths.

Documents loaded into supply trays of the document feeders may be picked up through pick-up rollers and supplied to transfer rollers. The documents loaded into the supply trays may be moved to pickable positions by moving the supply trays upward.

BRIEF DESCRIPTION OF THE DRAWINGS

FIG. 1 is a perspective view illustrating an image forming apparatus according to an example;

FIG. 2 is a schematic block diagram illustrating a configuration of an image forming apparatus according to an example;

FIG. 3 is a schematic cross-sectional diagram illustrating an image reading apparatus according to an example;

FIG. 4 is a schematic perspective view illustrating a driving relationship of a document feeder according to an example;

FIG. 5A is a schematic front view illustrating a driving relationship of a document feeder according to an example;

FIG. 5B is a schematic rear view illustrating a driving relationship of a document feeder according to an example;

FIG. 6 is a flowchart illustrating tray lifting of a document feeder according to an example;

FIG. 7A is a cross-sectional diagram illustrating a state that no document is in the image reading apparatus according to an example;

FIG. 7B is a cross-sectional diagram illustrating a state that document is located in a pickable position in the image reading apparatus according to an example;

FIG. 8 is a perspective view illustrating an example that a cover is removed from an image reading apparatus according to an example;

FIGS. 9A and 9B are enlarged diagrams illustrating a IX portion of FIG. 8 illustrating a relationship between a pick-up member and a second sensor according to an example; and FIG. 10 is a flowchart illustrating a method of confirming abnormal driving of a document feeder to an example.

DETAILED DESCRIPTION

Hereinafter, examples of the disclosure will be described more fully with reference to the accompanying drawings, in which the examples of the disclosure are shown to understand a configuration and an effect of the disclosure. The disclosure may, however, be embodied and modified in many different forms and should not be construed as limited to the examples set forth herein.

It will be understood that when an element (for example, a first element) is referred to as being "coupled with/to" or "connected to" another element (for example, a second element), it can be directly connected or coupled to the other element or intervening elements (for example, third elements) may be between the first element and the second element. Unless otherwise described, any portion including any element may refer to the portion further including other elements not excluding the other elements.

In the disclosure, the term "image forming job" may refer to various jobs (for example, print, scan, or facsimile) related to an image such as image formation or generation/storage/transmission of an image file and the term "job" may refer to an image forming job as well as a series of processes for performing the image forming job.

The term "image forming apparatus" may refer to an apparatus which prints printing data generated in a terminal apparatus such as a computer on a recording paper. For example, the image forming apparatus may include a printer, a copier, a facsimile, a multifunction peripheral (MFP) in which functions of the printer, the copier, and the facsimile are integrated into one apparatus, and the like. The image forming apparatus may refer to any apparatus which may perform an image forming job such as the printer, a scanner, and a fax machine, the MFP, a display apparatus, and the like.

The term "user" may refer to a person who performs an operation related to an image forming job using an image forming apparatus or a device coupled to the image forming apparatus in a wireless or wired form. The term "manager" may be a person who has authority to access all functions of the image forming apparatus and a system. The "user" and the "manager" may be the same person.

Herein, the term "image reading apparatus" may refer to an apparatus which scans an original image such as document, picture, or film and converts the scanned image to digital data. For example, the image reading apparatus may include a scanner, a copier, a facsimile, a multifunction peripheral (MFP) in which functions of the scanner, the copier, and the facsimile are integrated into one apparatus, and the like.

The term "image forming apparatus" may refer to an apparatus which prints generated printing data on a recording medium. For example, the image forming apparatus may include a printer, a copier, a facsimile, a multifunction peripheral (MFP) in which functions of the printer, the copier, and the facsimile are integrated into one apparatus, and the like.

In the following description, unless otherwise described, the same reference numerals are used for the same elements when they are depicted in different drawings.

According to the related driving method of the feeders, a driving source configured to drive a pick-up roller for pick-up of documents, a driving source configured to drive transfer rollers which supply the documents to conveying paths, and a driving source configured to drive supply trays may be separately provided. Accordingly, the manufacturing cost may be increased and a space efficiency may be degraded due to redundant installation of motors.

FIG. 1 is a perspective view illustrating an image forming apparatus according to an example.

Referring to FIG. 1, an image forming apparatus 1 may include an image forming unit 10 configured to form an image on a printing medium and an image reading apparatus 20 disposed in an upper side of the image forming unit 10 and configured to scan documents.

The image reading apparatus 20 may include a read-out unit 200 configured to scan an image from the document and a document feeder 100 rotatably installed in an upper side of the read-out unit 200 and configured to supply the document to be scanned automatically.

The document feeder 100 may be divided into a fixed pick-up type and an open pick-up type. The fixed pick-up type document feeder 100 may guarantee the stable document pick-up performance by fixing the pick-up roller configured to pick up the documents to a frame. The open pick-up type document feeder 100 may easily remove the jammed document by fixing the pick-up roller configured to pick up the documents to a cover.

FIG. 2 is a schematic block diagram illustrating a configuration of an image forming apparatus according to an example and FIG. 3 is a schematic cross-sectional diagram illustrating an image reading apparatus according to an example.

Referring to FIG. 2, the image reading apparatus 20 may include the document feeder 100, a single motor 110, an image sensor 210, and a processor 21.

The document feeder 100 may include a first driving device 120 configured to pick up a document D to a document conveying path 30, a second driving device 140 configured to drive a supply tray 50 upward, and a third driving device 150 configured to move the document D along the document conveying path 30.

The first to third driving devices 120, 140, 150 may perform image forming jobs according to control of the processor 21 and start-up of the motor 110. Detailed configurations of the first to third driving devices 120, 140, and 150 will be described later with reference to FIG. 3.

The motor 110 may operate the document feeder 100. For example, the motor 110 may simultaneously operate the first to third driving devices 120, 140, and 150. In this example, the motor 110 may be provided within the document feeder 100 and may be a direct current (DC) motor, a step motor, a brushless DC (BLDC) motor. The motor 110 may drive all the first to third driving devices 120, 140, and 150. The pick-up of the document, lifting of the supply tray 50, and document feeding driving may be simultaneously performed using the single motor 110. Accordingly, the manufacturing cost may be reduced and the inner space efficiency of the document feeder 100 may be increased.

The processor 21 may generate a driving signal for the motor 110 according to a driving command. The processor 21 may provide a preset power to the motor 110. For example, when the motor is a step motor, the processor 21 may receive the driving command (for example, current magnitude information and speed information), provide a constant current corresponding to the received current magnitude information to the step motor, and provide an impulse driving signal corresponding to the speed information to the step motor. When the motor is a BLDC motor, the processor 21 may receive the speed information, provide a preset constant voltage to the BLDC motor, and provide a driving signal corresponding to the received speed information to the BLDC motor.

The processor 21 may perform control for each component in the document feeder 100. For example, when print data is received from a print control terminal device, the processor 21 may control the operations of the first to third driving devices 120, 140, and 150 to print the received print data and transmit the driving command for the motor 110 configured to operate the first to third driving devices 120, 140, and 150.

The image sensor 210 may generate a scan image by scanning the document. For example, the image sensor 210 may be implemented with a read-out element configured to read out the document and a controller to control an operation of the read-out element.

The processor 21 may control the image sensor 210 to read out the document D. The document fed to the image reading apparatus 20 according to an example may have various standards in terms of size, for example, A4, A3, regal, and the like and the documents may have differences in leading end margins according to the standards. The processor 21 may control the document feeder 100 so that the document is read out with the leading end margin and a tailing end margin through the image sensor 210 by differentiating a pick-up timing of the document or a rising timing of the supply tray according to the standard of the fed document using the first and second sensors disposed in the image reading apparatus 20 according to an example.

Referring to FIG. 3, the image sensor 210 configured to scan an image from the document may be provided in the image reading apparatus 20. The image sensor 210 may scan the image of the document by irradiating light to the document and receiving the light reflected from the document. For example, a contact type image sensor (CIS), a charge coupled device (CCD), and the like may be employed as the image sensor 210.

The document feeder 100 may convey the document to the document conveying path 30 and the image recorded in the document may be read through the image sensor 210. The document feeder 100 may discharge the read-completed document. The document feeder 100 may include the supply tray 50, a frame 11, and a cover 15 rotatably installed in the frame 11. The frame 11 may include a discharge tray 60.

The document conveying path 30 may be provided in the document feeder 100 and the image sensor 210 may read an image from the conveying document. The document conveying path 30 may include, for example, a supply path 31, a read-out path 33, and a discharge path 35.

The image sensor 210 may be arranged in the read-out path 33 and the image recorded in the document may be read out through the image sensor 210 while the document passes through the read-out path 33. The supply path 31 may be a path which supplies the document to the read-out path 33 and the document loaded into the supply tray 50 may be supplied to the read-out path 33 via the supply path 31. The discharge path 35 may be a path which discharges the documents passing through the read-out path 33. Accordingly, the document loaded into the supply tray 50 may be conveyed along the supply path 31, the read-out path 33, and the discharge path 35 and discharged to the discharge tray 60.

A plurality of document transfer rollers configured to convey the document may be disposed in the document conveying path 30. A pick-up member 121 configured to pick up the document loaded into the supply tray 50 and convey the picked document, a reverse roller 130 disposed to face the pick-up member 121, and a first transfer roller 151 disposed in a downstream of the pick-up member 121 may be disposed in the document conveying path 30.

The pick-up member 121 may include a pick-up roller 122 configured to pick up the document loaded into the supply tray 50 and a feed roller 123 disposed close to the pick-up roller 122 and configured to convey the picked document. The pick-up roller 122 and the feed roller 123 may be interlocked with each other.

The pick-up member 121 may be installed to be coupled to a pick-up member housing 124 configured to protect the pick-up member and the pick-up member housing 124 may be included in the frame 11.

The reverse roller 130 may be disposed to face the pick-up member 121 and provide frictional force to a back surface of the document passing between the pick-up member 121 and the reverse roller 130 to an opposite direction to a document conveying direction. The reverse roller 130 may be rotated to a document conveying direction opposite to a document supply path or may not be rotated below a preset torque. When two or more documents are supplied between the reverse roller 130 and the feed roller 123, the reverse roller 130 may separate one document using a difference of the frictional force between the documents and supply the separated document to the first transfer roller 151. For example, when a plurality of documents are located between the reverse roller 130 and the feed roller 123, the frictional force between the documents may be smaller than the frictional force between the feed roller 123 and the document and the frictional force between the reverse roller 130 and the document. Accordingly, while a document which is in contact with the feed roller 123 and a document thereunder are slid with each other, the document which is in contact with the feed roller 123 is separated and conveyed toward the first transfer roller 151. Second and third transfer rollers 152 and 153 disposed to face the image sensor 210 and configured to convey the document may be disposed in the read-out path 33.

A discharge roller 154 configured to discharge a read-completed document may be disposed in the discharge path 35. The discharge roller 154 may include a driving roller and a driven roller which are rotated in engagement with each other.

The supply tray 50 may be formed to have a width corresponding to the document to be scanned. Moving guides 50a configured to support both widthwise sides of the document loaded into the supply tray 50 may be included in the supply tray 50.

FIGS. 4, 5A, and 5B are a schematic perspective view, a schematic front view, and a schematic rear view illustrating a driving relationship of a document feeder according to an example.

Referring to FIGS. 4, 5A, and 5B, the document feeder 100 according to an example may include the single motor 110, the first driving device 120 to pick up the document loaded into the supply tray 50 to the document conveying path through power received from the motor 110, the second driving device 140 configured to move the supply tray 50 loaded with the document to a pick-up roller side through the power received from the motor 110, and the third driving device 150 configured to convey the picked document along the document conveying path through the power received from the motor 110.

The first driving device 120, the second driving device 140, and the third driving device 150 may be installed within the frame 11 of the image reading apparatus 20.

The first driving device 120 may include a pick-up member 121, a plurality of gears 127 configured to transfer the driving force for rotating the pick-up member 121 from the motor 110, and a first clutch 129 configured to intermittently provide the driving force of the motor 110 to the pick-up member 121.

The pick-up member 121 may include the pick-up roller 122 configured to pick up the document loaded into the supply tray 50 and the reverse roller 130 configured to convey the document picked up through the pick-up roller 122. A gear 128 configured to transfer the driving force for rotating the reverse roller 130 may be coupled to one end portion of a rotation shaft 116 of the reverse roller (see 130 of FIG. 3). The gear 128 may be installed in the side frame 11. The pick-up roller 122 and the reverse roller 130 may be coupled through a belt.

The feed roller 123 may be installed to face the reverse roller 130 of the pick-up member 121. The reverse roller 130 may include an elastic member (see 131 of FIG. 3) configured to provide elastic force to a direction that the reverse roller 130 is close to the feed roller 123.

The motor 110 may be coupled to a plurality of gears and the power of the motor 110 may be simultaneously transferred to the first driving device 120, the second driving device 140, and the third driving device 150 via the gears.

The motor 110 may be coupled to the first clutch 129 through the plurality of gears 127 and the motor 110 may rotate the feed roller 123 and the reverse roller 130 fixed on coaxial axes by driving the plurality of gears 127 of the first driving device 120 according to the intermittence of the first clutch 129. Through the gear coupling, the feed roller 123 and the reverse roller 130 may rotate to the same direction. Accordingly, when a plurality of documents overlap each other and are double-fed, the plurality of documents may be sequentially conveyed in a reverse direction from the lowermost document through the frictional force of the reverse roller 130 and thus the double feeding may be prevented.

The plurality of gears 127 of the first driving device 120 may be driven and the pick-up roller 122 which rotates in engagement with the gears may be driven. Accordingly, the pick-up roller 122 may rotate to the same direction as the rotation direction of the feed roller 123 and the pick-up roller 122 may pick up the uppermost document among the plurality of documents loaded into the supply tray 50 and convey the picked document to the feed roller 123 and the reverse roller 130. The document conveyed from the pick-up roller 122 may be conveyed to the document conveying path 30 through the feed roller 123.

The processor 21 may control the first clutch 129 to be operated or released to control the driving of the first driving device 120 and thus the document conveyance to the document conveying path 30 may be intermittently performed.

The second driving device 140 may include the supply tray 50, a plurality of gears and the first to third reduction members 141, 142 and 143, configured to transfer the driving force for moving the supply tray 50 to a pick-up member 121 direction from the motor 110, and a second clutch 149 configured to intermittently provide the driving force of the motor 110 to the supply tray 50.

The motor 110 may be engaged with the plurality of gears configured to transfer the power to the second driving device 140. The power transferred through the plurality of gears may be transferred to the first reduction member 141 configured of a spur gear according to the intermittence of the second clutch 149.

The first reduction member 141 may be coupled to the second reduction member 142 configured to reduce the driving force received from the first reduction member 141. The second reduction member 142 may include a worm gear 142a coupled to the first reduction member 141 to rotate and a worm wheel 142b tooth-coupled with the worm gear 142a and configured to rotate to reduce the number of rotation.

The worm gear 142a may be coupled to the first reduction member 141 to rotate and the worm wheel 142b may be tooth-coupled with the worm gear 142a and transfer the rotation force in a vertical direction with respect to the first reduction member 141. The number of rotation may be reduced at a predetermined reduction ratio through the worm gear 142a and the worm wheel 142b.

The driving force transferred from the motor 110 may be transferred through the first reduction member 141 and reduced through the second reduction member 142.

The second reduction member 142 may be coupled to the third reduction member 143 configured of a bevel gear. The third reduction member 143 may include a first bevel gear 143a disposed in a rear end of the second reduction member 142 and configured to rotate at the reduced number of rotation and a second bevel gear 143b tooth-coupled with the first bevel gear 143a. The first bevel gear 143a may be coupled to the second reduction member 142 to rotate and the second bevel gear 143b may be engaged with the first bevel gear 143a and rotated through the first bevel gear 143a. The second bevel gear 143b tooth-coupled with the first bevel gear 143a may change a power direction transferred through the second reduction member 142. The third reduction member 143 may move the supply tray 50 upward or downward by axially changing the reduced driving force.

Like the general bevel gear, the rotation direction of the third reduction member 143 may be in perpendicular to the driving direction of the motor through the first and second bevel gears 141 and 142. A straight bevel gear or a spiral bevel gear may be used as the third reduction member 143.

The first reduction member 141 may be formed of a one-way gear. The one-way gear may be a gear configured to be rotatable to one direction and the first reduction member in the example may include a gear configured to move the supply tray 50 upward. The first reduction member 141 may be clutch-coupled to the driving side gear coupled to the motor 110 through the second clutch 149. The first reduction member 141 may be detachably coupled to the driving side gear coupled to the motor 110 through the clutch coupling.

A lift bar 146 may be rotated through the second driving device 140 and the supply tray 50 may be moved upward according to the rotation of the lift bar. The supply tray 50 moved upward may be prevented from being moved downward through the first reduction member 141. A bearing force may be generated through the relative reduction ratio of the first to third reduction members 141, 142, and 143. The first reduction member 141 may rotate the second reduction member 142 with a relatively small force, but the rotation force of above the reduction ratio may be necessary to rotate the first reduction member 141 through the second reduction member 142. Accordingly, the bearing force for supporting the supply tray 50 to prevent the supply tray 50 from being moved downward through the first reduction member 141 may be generated.

The processor 21 may control the second clutch 149 to be operated or released to control the driving of the second driving device 140 and thus the supply tray 50 loaded with the document D may be intermittently moved upward.

The third driving device 150 may include a plurality of transfer rollers 151, 152, 153, and 154 and a plurality of driving gears 151a, 152a, 153a, and 154a configured to transfer the driving force, which moves the document D along the document conveying path 30, from the motor 110.

The motor 110 may be engaged with the plurality of driving gears 151a, 152a, 153a, and 154a configured to transfer the power to the third driving device 150. For example, the power transferred through the first to fourth driving gears 151a to 154a may be transferred to the first to fourth transfer rollers 151 to 154.

The number of gears for power transfer may be differently set according to the position relationship among the motor 110, the supply tray 50, and the pick-up member 120.

All the power transfer methods in the example may be performed through the gear coupling, but this is not limited thereto and all or a portion of the power transfer methods may be performed through belt-pulley coupling.

FIG. 6 is a flowchart illustrating tray lifting of a document feeder according to an example.

Referring to FIG. 6, it may be detected whether or not the documents are loaded into the supply tray 50 of the image reading apparatus 20 (S601). For example, when the documents are loaded into the supply tray 50, the document D may be detected through a fourth sensor 175 installed in the supply tray 50 and the fourth sensor 175 may be changed to an on state. In this example, the supply tray 50 may move upward to a pick-up roller 122 direction (S602).

When the documents D are loaded into the supply tray 50 and the document D is in contact with the pick-up roller 122 in a pickable position through the upward movement of the supply tray 50, the document supply and feeding may start (S603).

When the document supply and feeding start, the documents loaded into the supply tray 50 may be conveyed along the document conveying path 30 one by one. During the document supply and feeding, the third sensor (see 125 of FIG. 8) may detect whether or not the document loaded into the supply tray 50 is located in the pickable position (S604). The third sensor 125 may be configured to detect whether or not an upper end of the documents loaded into the supply tray 50 is located in a preset height and may be installed in a position for detecting whether or not the pick-up roller 122 is located in a position suitable for picking up the document D. A detailed location position and driving method of the third sensor 125 will be described later.

When the document D is in contact with the pick-up roller 122 in the pickable position according to the upward movement of the supply tray 50 in a feeding process, the contact state between the document and the pick-up roller may be detected through the third sensor 125 and the third sensor 125 may be maintained in the on state. When the third sensor 125 is in the on state, the image of the document D may be read out and the document may be discharged (S605).

When the documents D loaded on the supply tray 50 are reduced by a preset number or more in the feeding process, the pick-up roller 122 which has been elastically pressed to a supply tray 50 direction may be moved downward. For example, the document D which is deviated from the pickable position may be detected through the third sensor 125 and the third sensor 125 may be changed to an off state.

In this example, the driving of the supply tray 50 for the upward movement may be controlled through the first sensor 171 and the second sensor 173 configured to detect the documents D in the spaced positions on the document conveying path 30.

The second sensor 173 disposed in the downstream of the first sensor 171 on the document conveying path 30 may detect whether or not the document D enters a section in which the second sensor 173 is located (S611). When the document D is not detected through the second sensor 173, the second sensor 173 may be changed to the off state. The current state may be maintained without the upward movement of the supply tray 50.

When the document D is detected through the second sensor 173, the second sensor 173 may be changed to the on state. When the second sensor 173 is in the on state, the first sensor 171 may detect whether or not the document D passes through the first sensor 171 (S613).

When the document D is located between the first sensor 171 and the second sensor 173, the first sensor 171 is in the on state. The current state may be maintained until the trailing end of the document D passes through the first sensor 171.

When the trailing end of the document D passes through the first sensor 171 and is located in a section in which the second sensor 173 is located, the second sensor 173 may be in the on state and the first sensor 171 may be changed to the off state. The processor 21 may turn on the operation of the second clutch 149 (S615) and transfer the driving force of the motor 110 to the second driving device 140 to move the supply tray 50 upward (S602).

When the document D is in contact with the pick-up roller 122 in the pickable position through the upward movement of the supply tray 50, the document supply and feeding may start (S603).

FIG. 7A is a cross-sectional diagram illustrating a state that no document is in the image reading apparatus according to an example and FIG. 7B is a cross-sectional diagram illustrating a state that document is located in a pickable position in the image reading apparatus according to an example.

Referring to FIGS. 7A and 7B, when the document is not loaded into the supply tray 50, the supply tray 50 may be located spaced apart from the pick-up roller 122 and as illustrated in FIG. 7B, when the document D is loaded into the supply tray 50, the document D may be detected through the fourth sensor 175 installed in the supply tray 50 and the supply tray 50 may move upward to the pick-up roller 122 direction.

For example, when the fourth sensor 175 detects the document D and outputs an on signal, the processor 21 may turn on the operation of the second clutch 149 and transfer the driving force of the motor 110 to the second driving device 140. In this example, the second driving device 140 may move the supply tray 50 upward to a pickable height.

The lift bar 146 may be rotated through the driving force received from the second driving device 140 and the supply tray 50 may move upward through the rotation of the lift bar 146. The documents D loaded into the supply tray 50 may push the pick-up roller 122 upward through the upward movement of the supply tray 50. When the pick-up roller 122 is located in the preset height, the documents D may be supplied and fed to the document conveying path 30. The preset height of the pick-up roller 122 may refer to a position that the document loaded into the supply tray 50 is pickable up through the pick-up roller 122.

When the document supply and feeding start, one document among the documents loaded into the supply tray 50 may enter along the document conveying path 30.

The first sensor 171 disposed close to the pick-up member 121 may detect whether or not the document enters the document conveying path 30. When the document D enters the pick-up roller 122, the leasing end of the document D may be detected through the first sensor 171 and the first sensor 171 may be changed to the on state.

The second sensor 173 disposed in the downstream of the first sensor 171 on the document conveying path 30 may be disposed close to the first transfer roller 151. The second sensor 173 may detect whether or not the document D passing through the first sensor 171 enters the second sensor 173. When the document D enters the first transfer roller 151, the leading end of the document D may be detected through the second sensor 173 and the second sensor 173 may be changed to the on state.

When the tailing end of the document D passes through the first sensor 171 while the document D moves along the document conveying path 30, the first sensor 171 may be changed to the off state. When the first sensor 171 is changed to the off state in a state that the first sensor 171 and the second sensor 173 are in the on state, the first driving device 120 may pick up the document D. For example, the first driving device 120 may turn on the first clutch 129 and drive the pick-up roller 122 to pick up the document D.

The first sensor 171 and the second sensor 173 may be disposed to be spaced at intervals. The leading end and the trailing end of the document D supplied to the document conveying path 30 may be detected through the first sensor 171 and the second sensor 173 and the leading end margin and the trailing end margin of the read-out image may be accurately corrected.

The document D may have various standards in terms of size, for example, A4, A3, regal, and the like and the image reading apparatus 20 according to an example may perform read-out on the documents D having the different sizes. The documents D may have differences in the leading end margins according to the standards of the documents D.

The documents D may be picked up by ensuring the interval between the documents according to the standards of the documents D based on the signals of the first sensor 171 and the second sensor 173.

FIG. 8 is a perspective view illustrating an example that a cover is removed from an image reading apparatus according to an example and FIGS. 9A and 9B are enlarged diagrams illustrating a IX portion of FIG. 8 illustrating a relationship between a pick-up roller and a second sensor according to an example.

Referring to FIG. 8, the document feeder 100 may detect the upward movement of the supply tray 50 by locating the third sensor 125 over the supply tray 50.

When the uppermost end of the documents loaded into the supply tray 50 is in contact with the pick-up roller 122 of the first driving device 120, the pick-up roller 122 may rotatably move on the basis of a rotation axis according to the upward movement of the supply tray 50. An extension portion 124*a* formed in one side of a housing 124 which covers the pick-up roller 122 and the feed roller 123 may be detected through the third sensor 125.

When the third sensor 125 is located in a position suitable for picking up the document through the pick-up roller 122, the third sensor 125 may be fixed to the position suitable for detecting the extension portion 124*a*.

When the pick-up roller 122 is moved to a preset position that the document D may be picked up, the extension portion 124*a* may be detected through the third sensor 125 and the third sensor 125 may be changed to the on state.

Referring to FIG. 9A, when the supply tray 50 is moved upward through the rotation of the lift bar 146 and the pick-up roller 122 is pushed upward, the extension portion 124*a* of the housing 124 of the pick-up member 121 may be detected through the third sensor 125 and the driving of the lift bar 146 may be terminated.

For example, when the pick-up roller 122 reaches a fixed height through the upward rotation of the supply tray 50, the pick-up roller 122 may be detected through the third sensor 125 and the processor 21 may turn off the operation of the second clutch 149 based on the detected signal. When the second clutch 149 is turned off, the power may not be transferred to the second driving device 140 from the motor 110 and the lift bar 146 may not be driven. In this example, the force applied downward to the lift bar 146 through the gravity of the supply tray 50 may be supported through the first to third reduction members 141 to 143 and even when the power transfer is interrupted, the supply tray 50 may be maintained in a stop state.

Referring to FIG. 9B, when the documents D loaded on the supply tray 50 are reduced by a preset number or more in the feeding process, the pick-up roller 122 which has been elastically pressed to the supply tray 50 direction may be moved downward. For example, the extension portion 124a may be deviated from the third sensor 125 and the third sensor 125 may be changed to an off state. In this example, the processor 21 may turn on the operation of the second clutch 149 again and move the supply tray 50 upward to an appropriate height as illustrated in FIG. 9A.

FIG. 10 is a flowchart illustrating a method of confirming abnormal driving of a document feeder to an example.

Referring to FIG. 10, when the user presses the supply tray 50 downward with above a threshold strength or an external force is applied to the supply tray 50 during the upward moving of the supply tray 50 (S1001), the configuration of the second driving device 140 may be damaged. To prevent the damage of the second driving device, the image reading apparatus 20 may include a driving circuit having a detection circuit configured to detect a current magnitude provided to the motor. The detection circuit may detect the current magnitude provided to the motor 110 (S1002). The processor 21 may receive information for the current magnitude detected through the detection circuit of the driving circuit and the processor 21 may determine the abnormality of the motor 110 by determining whether or not the detected current magnitude is equal to or larger than a preset value based on the information for the detected current magnitude (S1003). For example, the processor 21 may determine the abnormality of the motor based on available current range information (for example, current lower limit information and current upper limit information) and the detected current magnitude when normally processing the driving command provided to the motor 110.

The processor 21 may stop the driving of the motor 110 when the motor abnormality is detected or the abnormal defect is confirmed (S1004). For example, the processor 21 may stop the driving of the motor 110 and drive the motor to be reversely rotated (S1005). When it is determined that the motor abnormality is detected or the confirmed abnormal defect is serious, the processor 21 may stop a currently performing job and reversely rotate the motor 110.

Accordingly, the document feeder 100 according to an example may detect the current value applied to the motor 110 by including the detection circuit and may stop the upward movement of the supply tray 50 and move the supply tray 50 downward again when the current equal to or larger than an average driving current is applied during the upward movement of the supply tray 50. The motor 110 of the document feeder 100 according to the example may enable vector control. Accordingly, the damage of the first to third reduction members 141 to 143 constituting the second driving device 140 may be prevented.

The document feeder and the image reading apparatus according to the example may be applied to a C path-type image forming apparatus as well as an S path-type image forming apparatus.

The foregoing examples are merely examples and are not to be construed as limiting the disclosure. The teaching can be readily applied to other types of apparatuses. Also, the description of the examples of the disclosure is intended to be illustrative, and not to limit the scope of the claims, and many examples, modifications, and variations will be apparent to those skilled in the art.

The invention claimed is:

1. An image reading apparatus comprising:
an image sensor to scan documents;
a document feeder to move loaded documents to a document conveying path using a single motor; and
a processor to control the document feeder and the image sensor to scan the loaded documents,
wherein the document feeder includes:
a first driving device including a pick-up member to intermittently use a driving force of the single motor through a first clutch to move the loaded documents from a tray to the document conveying path;
a second driving device to intermittently use the driving force of the single motor through a second clutch to move the tray loaded with the documents to a side of the pick-up member;
a third driving device to use the driving force of the single motor to move the documents along the document conveying path onto the image sensor; and
first and second sensors to detect the documents in positions spaced on the document conveying path, the first and second sensors to output signals, and
wherein the processor controls an operation of the first clutch based on the signals of the first and second sensors, and wherein the second driving device includes a first reduction member to transfer the driving force of the single motor, a second reduction member to reduce the driving force transferred from the first reduction member, and a third reduction member to axially change the driving force reduced through the second reduction member.

2. The image reading apparatus as claimed in claim 1, wherein
the first sensor is installed upstream of the document conveying path with respect to the second sensor, and
the processor controls the first clutch to provide no driving force of the single motor to the first driving device when the signals of the first and second sensors are in an on state.

3. The image reading apparatus as claimed in claim 1, wherein the document feeder further includes a third sensor to detect whether an upper end of the documents loaded into the tray is located at a preset height, the third sensor to output a signal.

4. The image reading apparatus as claimed in claim 3, wherein the processor controls the second clutch to provide the driving force of the single motor to the second driving device when the signal of the third sensor is in an off state.

5. The image reading apparatus as claimed in claim 1, further including a detection circuit to detect a current magnitude of driving power provided to the single motor,
wherein the processor determines an operation state of the single motor based on the detected current magnitude.

6. The image reading apparatus as claimed in claim 5, wherein the processor controls the single motor to perform reverse rotation driving when the determined operation state is an overload state.

7. The image reading apparatus as claimed in claim 1, wherein the second driving device supports the tray through a relative reduction ratio between the first reduction member and the second reduction member.

8. The image reading apparatus as claimed in claim 1, wherein the document feeder further includes a fourth sensor to detect whether the documents are loaded into the tray,
wherein the processor controls the document feeder to stop driving of the single motor after a preset time elapsed when an output signal of the fourth sensor is changed to an off state.

9. An image reading apparatus comprising:
an image sensor to scan documents;
a document feeder to move loaded documents to a document conveying path using a single motor; and
a processor to control the document feeder and the image sensor to scan the loaded documents,
wherein the document feeder includes:
a first driving device including a pick-up member to intermittently use a driving force of the motor through a first clutch to move the loaded documents from a tray to the document conveying path;
a second driving device to intermittently use the driving force of the motor through a second clutch to move the tray loaded with the documents to a side of the pick-up member;
a third driving device to use the driving force of the motor to move the documents along the document conveying path onto the image sensor; and
first and second sensors to detect the documents in positions spaced on the document conveying path, the first and second sensors to output signals, and
wherein the processor controls an operation of the first clutch based on the signals of the first and second sensors,
wherein:
the first sensor is installed upstream of the document conveying path with respect to the second sensor,
the processor controls the first clutch to provide no driving force of the motor to the first driving device when the signals of the first and second sensors are in an on state,
the processor controls the first clutch to provide the driving force of the motor to the first driving device when the signals of the first and second sensors are in the on state and the signal of the first sensor is changed to an off state.

10. A document feeder, comprising:
a tray to include documents;
a pick-up device to move the documents from the tray to a document conveying path one by one;
a lifting device to move the tray with the documents to a side of the pick-up device;
a feeding device disposed in the document conveying path to convey the moved documents to be scanned; and
first and second sensors to detect the documents in spaced positions on the document conveying path, the first and second sensors to output signals
wherein
the pick-up device, the lifting device, and the feeding device are driven through a single motor,
the documents are moved by the pick-up device when the first sensor is in an off state and the second sensor disposed is in an on state, the second sensor being downstream of the document conveying path with respect to the first sensor, and
the driving force of the single motor is provided to the lifting device to move the tray to the side of the pick-up device when the signals of the first and second sensors are in the on state and the signal of the first sensor is changed to the off state.

11. The document feeder as claimed in claim 10, wherein the driving force of the single motor is provided to the pick-up device when the signals of the first and second sensors are in the on state and the signal of the first sensor is changed to the off state.

12. The document feeder as claimed in claim 10, further including a third sensor to detect whether the pick-up device is located at a preset height, the third sensor to output a signal.

13. The document feeder as claimed in claim 12, wherein the driving force of the single motor is provided to the lifting device when the signal of the third sensor is in an off state.

* * * * *